United States Patent
Tu et al.

(10) Patent No.: US 11,981,332 B2
(45) Date of Patent: May 14, 2024

(54) POWER CONTROL METHOD AND TERMINAL DEVICE FOR HYDRAULIC HYBRID VEHICLE, AND STORAGE MEDIUM

(71) Applicant: Xiamen Yaxon Network Co., Ltd., Fujian (CN)

(72) Inventors: Yankai Tu, Fujian (CN); Weibin Chi, Fujian (CN)

(73) Assignee: Xiamen Yaxon Network Co., Ltd., Fujian (CN)

( * ) Notice: Subject to any disclaimer, the term of this patent is extended or adjusted under 35 U.S.C. 154(b) by 0 days.

(21) Appl. No.: 18/005,631

(22) PCT Filed: Aug. 18, 2020

(86) PCT No.: PCT/CN2020/109667
§ 371 (c)(1),
(2) Date: Jan. 16, 2023

(87) PCT Pub. No.: WO2022/011771
PCT Pub. Date: Jan. 20, 2022

(65) Prior Publication Data
US 2023/0286511 A1    Sep. 14, 2023

(30) Foreign Application Priority Data

Jul. 15, 2020    (CN) .......................... 202010678051.5

(51) Int. Cl.
*B60W 40/076*    (2012.01)
*B60W 10/06*    (2006.01)
(Continued)

(52) U.S. Cl.
CPC .......... *B60W 40/076* (2013.01); *B60W 10/06* (2013.01); *B60W 10/24* (2013.01);
(Continued)

(58) Field of Classification Search
CPC ...... B60W 4/076; B60W 10/06; B60W 10/24; B60W 10/04; B60W 10/30;
(Continued)

(56) References Cited

FOREIGN PATENT DOCUMENTS

| CA | 2234075 | * 5/2000 | .......... B60K 17/365 |
| CN | 1927632 A | 3/2007 | |

(Continued)

OTHER PUBLICATIONS

International Search Report cited in PCT/CN2020/109667 mailed Apr. 19, 2021, 8 pages.

(Continued)

*Primary Examiner* — Hai H Huynh
(74) *Attorney, Agent, or Firm* — Cooper Legal Group, LLC

(57) ABSTRACT

The present invention relates to a power control method and terminal device for a hydraulic hybrid vehicle, and a storage medium. The method includes: S1: predicting, according to environmental information of a road ahead, recoverable energy in the road ahead; S2: calculating, according to the predicted recoverable energy, a critical pressure required by a hydraulic accumulator to recover the recoverable energy; and S3: determining whether a current pressure of the hydraulic accumulator is greater than the critical pressure, and if so, reducing fuel output power of an engine and controlling the hydraulic accumulator to release energy such that the current pressure of the hydraulic accumulator is less than or equal to the critical pressure. According to the present invention, when it is predicted that there is a high probability of energy recovery ahead, the energy stored in the hydraulic accumulator is used up in advance, so that the hydraulic accumulator has enough space to recover energy when the energy recovery occurs in future. This can make full use of the characteristic of the hydraulic accumulator of (Continued)

being suitable for frequent storage and release of energy, thereby achieving the economy of energy consumption of the whole vehicle.

6 Claims, 1 Drawing Sheet

(51) Int. Cl.
*B60W 10/24* (2006.01)
*F02D 41/38* (2006.01)

(52) U.S. Cl.
CPC ... *F02D 41/3863* (2013.01); *B60W 2530/201* (2020.02); *B60W 2552/15* (2020.02); *B60W 2552/40* (2020.02); *B60W 2555/20* (2020.02); *B60W 2710/0627* (2013.01); *B60W 2710/24* (2013.01)

(58) Field of Classification Search
CPC ....... B60W 2530/201; B60W 2552/15; B60W 2552/40; B60W 2552/20; B60W 2710/0627; B60W 2710/24; B60W 2710/06; B60W 2710/30; B60W 20/12; B60W 2050/0043; B60W 2555/20; B60W 30/18127; F02D 41/3863; B60K 6/12; Y02T 10/62; G06Q 10/04
USPC ......... 701/103, 104, 105; 180/65.21, 65.275, 180/65.28, 65.285, 65.29
See application file for complete search history.

(56) References Cited

FOREIGN PATENT DOCUMENTS

| | | |
|---|---|---|
| CN | 104973057 A | 10/2015 |
| CN | 105691383 A | 6/2016 |
| CN | 107074238 A | 8/2017 |
| CN | 107747948 A | 3/2018 |
| CN | 107804155 A | 3/2018 |
| JP | 2013005485 A | 1/2013 |
| WO | 2020086375 A1 | 4/2020 |

OTHER PUBLICATIONS

Written Opinion cited in PCT/CN2020/109667 mailed Apr. 19, 2021, 4 pages.

\* cited by examiner

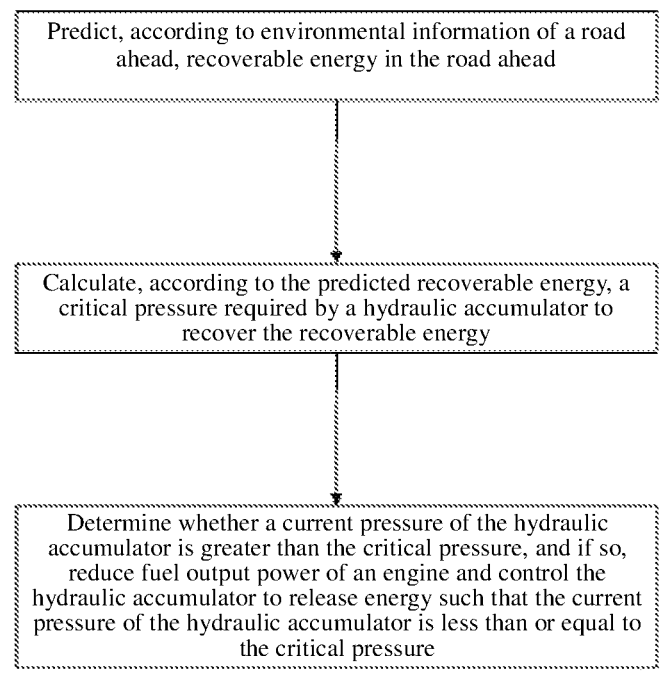

POWER CONTROL METHOD AND TERMINAL DEVICE FOR HYDRAULIC HYBRID VEHICLE, AND STORAGE MEDIUM

TECHNICAL FIELD

The present invention relates to the field of vehicle control, and in particular to a power control method and terminal device for a hydraulic hybrid vehicle, and a storage medium.

BACKGROUND

A power system of a hydraulic hybrid vehicle (HHV) includes an engine and a hydraulic accumulator. The hydraulic accumulator has high power density, high energy storage and release speed and high energy recovery efficiency, and is suitable for frequent storage and release of energy. Therefore, compared with electric hybrid technology, hydraulic hybrid technology is more competitive in mid-size and heavy vehicles and construction machinery. However, the energy density of the hydraulic accumulator is much lower than that of the battery. If the hydraulic accumulator is used to store more energy, this will require a very large size of the hydraulic accumulator. As a result, the hydraulic accumulator of the hydraulic hybrid vehicle usually stores limited energy. In order to achieve higher economy of the hydraulic hybrid vehicle, it is necessary to make full use of limited energy storage space of the hydraulic accumulator, recover vehicle braking or coasting energy as much as possible and use the recovered energy as efficiently as possible.

Energy management strategies of both parallel and series hydraulic hybrid vehicles are real-time control strategies in which power output or energy recovery of the engine and the hydraulic accumulator are distributed according to the power demand of the vehicle, and there is no predictive control of energy output distribution based on the geographical environment and operating conditions ahead.

SUMMARY

In order to solve the above problems, the present invention provides a power control method and terminal device for a hydraulic hybrid vehicle, and a storage medium.

The specific solutions are as follows:

Provided is a power control method and terminal device for a hydraulic hybrid vehicle, including the following steps:

S1: predicting, according to environmental information of a road ahead, recoverable energy in the road ahead;

S2: calculating, according to the predicted recoverable energy, a critical pressure required by a hydraulic accumulator to recover the recoverable energy; and S3: determining whether a current pressure of the hydraulic accumulator is greater than the critical pressure, and if so, reducing fuel output power of an engine and controlling the hydraulic accumulator to release energy such that the current pressure of the hydraulic accumulator is less than or equal to the critical pressure.

Further, the environmental information of the road ahead is obtained from electronic horizon data.

Further, a specific process of predicting the recoverable energy in the road ahead includes the following steps:

S101: finding in real time whether there is a downhill section in the road ahead of a current position of the vehicle according to the electronic horizon data, and if so, proceeding to S102; and S102: acquiring a gradient θ and a slope length L of the downhill section closest to the current position of the vehicle according to the electronic horizon data, determining whether the gradient θ is greater than a gradient threshold $θ_1$, and if so, calculating the recoverable energy W in the road ahead according to the following formula:

$$W = mgL\left(-\mu - \frac{C_d H V_a^2}{21.15mg} - \theta\right)$$

where m represents mass, g represents gravity acceleration, μ represents a road friction coefficient, $C_d$ represents air density, H represents a frontal area of the vehicle, and $V_a$ represents a windward wind speed of the vehicle.

A calculation formula of the gradient threshold $θ_1$ is:

$$\theta_1 = -\mu - \frac{C_d H V_a^2}{21.15mg}.$$

Further, a calculation formula of the critical pressure required by the hydraulic accumulator to recover the recoverable energy is:

$$p_c = p_1 {}^{n-1/n}\sqrt{\left(\frac{p_1}{p_{max}}\right)^{1-n/n} - \frac{n-1}{p_1 V_1}W}$$

where $P_c$ represents the critical pressure, $p_{max}$ represents a maximum pressure of a hydraulic system, and $p_1$ represents a minimum operating pressure of the hydraulic accumulator; $V_1$ represents a volume of gas in the hydraulic accumulator under the minimum pressure; and n represents a polytropic index of the gas.

Provided is a power control terminal device for a hydraulic hybrid vehicle, including a processor, a memory, and a computer program stored in the memory and running in the processor. The processor, when executing the computer program, implements the steps in the method in the embodiments of the present invention.

Provided is a computer-readable storage medium having a computer program stored thereon. The computer program, when executed by a processor, implements the steps in the method in the embodiments of the present invention.

According to the above technical solutions of the present invention, when it is predicted that there is a high probability of energy recovery ahead, the energy stored in the hydraulic accumulator is used up in advance, so that the hydraulic accumulator has enough space to recover energy when the energy recovery occurs in future. This can make full use of the characteristic of the hydraulic accumulator of being suitable for frequent storage and release of energy, thereby achieving the economy of energy consumption of the whole vehicle.

BRIEF DESCRIPTION OF DRAWINGS

FIG. 1 shows a flowchart of Embodiment I of the present invention.

DESCRIPTION OF EMBODIMENTS

To further illustrate the embodiments, the accompanying drawings are provided in the present invention. These accompanying drawings are a part of the contents disclosed in the present invention that are mainly used to illustrate the embodiments, and can be used in conjunction with the related descriptions in the specification to explain the operation principle of the embodiments. With reference to these contents, those skilled in the art will be able to understand other possible implementations and advantages of the present invention.

The present invention will be further described in conjunction with the accompanying drawings and the specific implementations.

Embodiment I

This embodiment of the present invention provides a power control method for a hydraulic hybrid vehicle. As shown in FIG. 1, the method includes the following steps:

S1: Predict, according to environmental information of a road ahead, recoverable energy W in the road ahead.

In this embodiment, the environmental information of the road ahead is obtained from electronic horizon data.

The electronic horizon is a technique used for vehicles to predict information of the road ahead, which searches for accurate information of the road ahead of the current position of the vehicle according to map data and satellite positioning signals such that the vehicle has the ability to predict road conditions within a certain distance ahead. The electronic horizon data includes various types of road and traffic information, such as gradients, curves, traffic signs, etc. The information in the electronic horizon used in this embodiment includes gradient information, curve information, speed limit information, and other terrain and road information closely related to changes in power demands of the vehicle.

A specific method for predicting the recoverable energy W includes:

S101: Find in real time whether there is a downhill section in the road ahead of a current position of the vehicle according to the electronic horizon data, and if so, proceed to S102.

S102: Acquire a gradient θ and a slope length L of the downhill section closest to the current position of the vehicle according to the electronic horizon data, determine whether the gradient θ of the downhill section closest to the current position of the vehicle is greater than a gradient threshold $θ_1$, and if so, which indicates that the gradient θ is enough for the vehicle to coast at the current speed, calculate the recoverable energy W in the road ahead according to the following formula:

$$W = mgL\left(-u - \frac{C_d H V_a^2}{21.15 mg} - θ\right)$$

where m represents mass, g represents gravity acceleration, μ represents a road friction coefficient, $C_d$ represents air density, H represents a frontal area of the vehicle, and $V_a$ represents a windward wind speed of the vehicle, including a forward speed of the vehicle and a current external wind speed.

The derivation process of the above calculation formula of the recoverable energy W is described below.

Since the engine does not output power when the vehicle is in the coasting state, at this time, the kinetic equation of the vehicle in the running process is:

$$F = F_a + F_{rot} + F_{slope} + F_{win} \quad (1)$$

where F represents a driving force of an engine output torque acting on wheels through a transmission system; and $F_a$ represents a force that causes acceleration of the vehicle, $F_{rot}$ represents frictional resistance between the wheels and the ground, $F_{slope}$ represents gravity resistance of the gradient, and $F_{win}$ represents wind resistance received by the vehicle.

There are also:

$$F_a = ma$$

$$F_{rot} = mgμ$$

$$F_{slope} = mgθ$$

$$F_{win} = \frac{C_d H V_a^2}{21.15}$$

where a represent acceleration.

Therefore, formula (1) may be written as:

$$F = ma + mgu + mgθ + \frac{C_d H V_a^2}{21.15} \quad (2)$$

Since the vehicle is running at a constant speed, ma=0; and since the vehicle is in the coasting state, F=0. Therefore, in the coasting state, formula (2) can be transformed into:

$$-mgθ = mgu + \frac{C_d H V_a^2}{21.15}$$

That is, when the gradient θ of the downhill section is $$-u - \frac{C_d H V_a^2}{21.15 mg},$$

since the gradient is too steep, a part of downhill energy must be recovered to keep the vehicle running at a constant speed. In the downhill process, the vehicle may enter into an energy recovery state, and the recoverable energy W is:

$$W = mgL\left(-u - \frac{C_d H V_a^2}{21.15 mg} - θ\right)$$

S2: Calculate, according to the predicted recoverable energy W, a critical pressure required by a hydraulic accumulator to recover the recoverable energy W.

A calculation formula of energy S that can be stored in the current remaining space of the hydraulic accumulator is:

$$S = \frac{p_1 V_1}{n-1}\left[\left(\frac{p_1}{p_{max}}\right)^{1-n/n} - 1\right] - \frac{p_1 V_1}{n-1}\left[\left(\frac{p_1}{p_n}\right)^{1-n/n} - 1\right] =$$

$$\frac{p_1 V_1}{n-1}\left[\left(\frac{p_1}{p_{max}}\right)^{1-n/n} - 1\right] - \left(\frac{p_1}{p_n}\right)^{1-n/n}\right]$$

where $p_{max}$ represents a maximum pressure of a hydraulic system, $p_n$ represents a current pressure of the hydraulic accumulator, and $p_1$ represents a minimum operating pressure of the hydraulic accumulator; $V_1$ represents a volume of gas in the hydraulic accumulator under the minimum pressure; and n represents a polytropic index of the gas.

If the recoverable energy W is greater than the energy S that can be stored in the current remaining space of the hydraulic accumulator, then it is necessary to further control the hydraulic accumulator to release energy to obtain enough energy storage space.

The energy S that can be stored in the current remaining space of the hydraulic accumulator is made equal to the recoverable energy W, and the critical pressure $P_c$ required by the hydraulic accumulator to recover the recoverable energy W is calculated as:

$$\frac{p_1 V_1}{n-1}\left[\left(\frac{p_1}{p_{max}}\right)^{1-n/n} - \left(\frac{p_1}{p_c}\right)^{1-n/n}\right] = W$$

$$p_c = p_1{}^{n-1/n}\sqrt{\left(\frac{p_1}{p_{max}}\right)^{1-n/n} - \frac{n-1}{p_1 V_1}W}$$

S3: Determine whether a current pressure $p_n$ of the hydraulic accumulator is greater than the critical pressure $P_c$, and if so, reduce fuel output power of an engine and control the hydraulic accumulator to release energy such that the current pressure $p_n$ of the hydraulic accumulator is less than or equal to the critical pressure $P_c$.

In Embodiment I of the present invention, the electronic horizon system is used in energy management of the hydraulic hybrid vehicle, a power controller of the hydraulic hybrid vehicle is connected to the electronic horizon system, the terrain ahead of the vehicle is obtained from the electronic horizon system, the energy recovery ahead is predicted according to the terrain ahead, and predictive control in advance is performed on the energy release of the hydraulic accumulator. The method of this embodiment can ensure to a greater extent the hydraulic accumulator with limited capacity to recover and utilize as much energy as possible, thereby improving the vehicle economy.

Embodiment II

The present invention further provides a power control terminal device for a hydraulic hybrid vehicle, including a memory, a processor, and a computer program stored in the memory and capable of running in the processor. The processor, when executing the computer program, implements the steps in the method embodiment in Embodiment I of the present invention.

Further, as a feasible implementation, the power control terminal device for a hydraulic hybrid vehicle may be an on-board computer, a cloud server or other computing devices. The power control terminal device for a hydraulic hybrid vehicle may include, but not limited to, a processor and a memory. It can be understood by those skilled in the art that the composition of the power control terminal device for a hydraulic hybrid vehicle is merely an example of the power control terminal device for a hydraulic hybrid vehicle, and does not constitute a limitation to the power control terminal device for a hydraulic hybrid vehicle. The power control terminal device for a hydraulic hybrid vehicle may include more or less components than the above, or a combination of some components, or different components. For example, the power control terminal device for a hydraulic hybrid vehicle may further include input-output devices, network access devices, buses, etc., which is not limited by the embodiment of the present invention.

Further, as a feasible implementation, the processor may be a central processing unit (CPU), other general-purpose processors, a digital signal processor (DSP), an application specific integrated circuit (ASIC), a field-programmable gate array (FPGA) or other programmable logic devices, a discrete gate or transistor logic device, a discrete hardware component, etc. The general-purpose processor may be a microprocessor, or the processor may also be any conventional processor, etc. The processor is the control center of the power control terminal device for a hydraulic hybrid vehicle, and connects all parts of the entire power control terminal device for a hydraulic hybrid vehicle using various interfaces and lines.

The memory can be used for storing the computer program and/or module. The processor implements various functions of the power control terminal device for a hydraulic hybrid vehicle by running or executing the computer program and/or module stored in the memory and calling the data stored in the memory. The memory may mainly include a program storage area and a data storage area. The program storage area may store an operating system and application programs required by at least one function. The data storage area may store data created according to the use of a mobile phone, etc. Besides, the memory may include a high-speed random access memory, and may further include a non-volatile memory, such as a hard disk, an internal memory, a plug-in hard disk, a smart media card (SMC), a secure digital (SD) card, a flash card, at least one disk memory device, a flash memory device, or other volatile solid-state memory devices.

The present invention further provides a computer-readable storage medium having a computer program stored thereon. The computer program, when executed by a processor, implements the steps in the method in the embodiments of the present invention.

If an integrated module/unit of the power control terminal device for a hydraulic hybrid vehicle is implemented in the form of a software functional unit and sold or used as an independent product, it can be stored in a computer-readable storage medium. Based on such understanding, the implementation of all or part of the processes in the method of the embodiments of the present invention may also be completed by instructing related hardware by the computer program. The computer program may be stored in a computer-readable storage medium. The computer program, when executed by the processor, can implement the steps in the method embodiments. The computer program includes a computer program code, which may be in the form of a source code, an object code or an executable file, or in some intermediate forms. The computer-readable medium may include: any entity or apparatus capable of carrying the computer program code, a recording medium, a USB flash drive, a removable hard drive, a magnetic disk, an optical disk, a computer memory, a read-only memory (ROM), a random access memory (RAM), a software distribution medium, etc.

Although the present invention has been specifically shown and described in connection with the preferred implementations, it should be understood by those skilled in the art that various changes in form and details can be made without departing from the spirit and scope of the present invention as defined by the appended claims, and shall all fall within the protection scope of the present invention.

The invention claimed is:

1. A power control method for a hydraulic hybrid vehicle, comprising the following steps:

S1: predicting, according to environmental information of a road ahead, recoverable energy in the road ahead;

S2: calculating, according to the predicted recoverable energy, a critical pressure required by a hydraulic accumulator to recover the recoverable energy; and S3: determining whether a current pressure of the hydraulic accumulator is greater than the critical pressure, and if so, reducing fuel output power of an engine and controlling the hydraulic accumulator to release energy such that the current pressure of the hydraulic accumulator is less than or equal to the critical pressure.

2. The power control method for a hydraulic hybrid vehicle according to claim 1, wherein the environmental information of the road ahead is obtained from electronic horizon data.

3. The power control method for a hydraulic hybrid vehicle according to claim 2, wherein a specific process of predicting the recoverable energy in the road ahead comprises the following steps:

S101: finding in real time whether there is a downhill section in the road ahead of a current position of the vehicle according to the electronic horizon data, and if so, proceeding to S102; and S102: acquiring a gradient $\theta$ and a slope length L of the downhill section closest to the current position of the vehicle according to the electronic horizon data, determining whether the gradient $\theta$ is greater than a gradient threshold $\theta_1$, and if so, calculating the recoverable energy W in the road ahead according to the following formula:

$$W = mgL\left(-u - \frac{C_d H V_a^2}{21.15mg} - \theta\right)$$

wherein m represents mass, g represents gravity acceleration, $\mu$ represents a road friction coefficient, $C_d$ represents air density, H represents a frontal area of the vehicle, and $V_a$ represents a windward wind speed of the vehicle; and a calculation formula of the gradient threshold $\theta_1$ is:

$$\theta_1 = -u - \frac{C_d H V_a^2}{21.15mg}.$$

4. The power control method for a hydraulic hybrid vehicle according to claim 1, wherein a calculation formula of the critical pressure required by the hydraulic accumulator to recover the recoverable energy is:

$$p_c = p_1^{n-1/n} \sqrt{\left(\frac{p_1}{p_{max}}\right)^{1-n/n} - \frac{n-1}{p_1 V_1} W}$$

wherein $P_c$ represents the critical pressure, $p_{max}$ represents a maximum pressure of a hydraulic system, and $p_1$ represents a minimum operating pressure of the hydraulic accumulator; $V_1$ represents a volume of gas in the hydraulic accumulator under the minimum pressure; and n represents a polytropic index of the gas.

5. A power control terminal device for a hydraulic hybrid vehicle, comprising a processor, a memory, and a computer program stored in the memory and running in the processor, wherein the processor, when executing the computer program, implements the steps in the method according to any of claims 1 to 4.

6. A computer-readable storage medium having a computer program stored thereon, wherein the computer program, when executed by a processor, implements the steps in the method according to any of claims 1 to 4.

* * * * *